United States Patent [19]

Baatz et al.

[11] 4,119,565

[45] Oct. 10, 1978

[54] PRODUCTION OF MICROCAPSULES, AND THE RESULTING MICROCAPSULES

[75] Inventors: Günther Baatz, Cologne; Manfred Dahm, Leverkusen; Walter Schäfer, Cologne, all of Germany

[73] Assignee: Bayer Aktiengesellschaft, Leverkusen-Bayerwerk, Germany

[21] Appl. No.: 791,545

[22] Filed: Apr. 27, 1977

[30] Foreign Application Priority Data

May 3, 1976 [DE] Fed. Rep. of Germany ....... 2619524

[51] Int. Cl.$^2$ ............................................. B01J 13/02
[52] U.S. Cl. ......................................... 252/316; 8/79; 71/64 F; 260/551 CD; 521/76
[58] Field of Search .......................... 252/316; 424/32; 260/2.5 BF, 551 CD

[56] References Cited

U.S. PATENT DOCUMENTS

| | | | |
|---|---|---|---|
| 2,853,473 | 9/1958 | Campbell et al. | 260/551 CD X |
| 3,432,327 | 3/1969 | Kan et al. | 252/316 X |
| 3,640,966 | 2/1972 | Hennig et al. | 260/2.5 BF X |
| 3,677,787 | 7/1972 | Augl et al. | 252/316 X |

OTHER PUBLICATIONS

Flinn et al.: "What is Happening in Microencapsulation," Chemical Engineering, Dec. 4, 1967, pp. 171–178.

*Primary Examiner*—Richard D. Lovering
*Attorney, Agent, or Firm*—Connolly and Hutz

[57] ABSTRACT

Production of microcapsules, wherein a film-forming polycarbodiimide with functional terminal isocyanate groups is dissolved in the core material or in an inert solvent and a miscible core material is added and the resulting organic phase is introduced into an immiscible liquid phase which contains a dissolved catalyst for isocyanate reactions, and the microcapsules formed are isolated after the reaction of the shell-forming polymer.

5 Claims, No Drawings

PRODUCTION OF MICROCAPSULES, AND THE RESULTING MICROCAPSULES

The present invention relates to the production of microcapsules whose external shell is a film-forming polycarbodiimide.

The invention relates to a process for the production of microcapsules, wherein a film-forming polycarbodiimide having functional terminal isocyanate groups is dissolved in the core material or in an inert solvent or solvent mixture, and a core material which is miscible with it, is added, the resulting organic phase (subsequently termed "inner phase") is introduced into a liquid phase immiscible with the organic phase such as water (subsequently termed "outer phase") which contains a dissolved catalyst for isocyanate reactions, and the microcapsules formed are isolated.

In order to carry out this "reactive process," i.e., an encapsulation, by polyreaction at the organic phase interface in a dispersion, the polycarbodiimide is dissolved in the core material or in an inert solvent or solvent mixture and subsequently mixed with the core material. In a shear gradient which is preferably generated by intensive mixing with small mixers or mixing machines, this homogeneous mixture is then introduced into a liquid phase immiscible with it, for example water, which contains an isocyanate-reactive polyamine. The amine may also be added subsequently.

It has now surprisingly been found that polyamines which are suitable for carrying out the process not only include those which contain an amino group which is capable of reacting with isocyanate groups (and produce the capsule wall by reaction at the phase interface in the dispersion), but also that water-soluble catalytically active tertiary amines similarly harden the organic phase interface as well as catalytically active inorganic or organic bases.

The addition of these catalysts produces a series of advantages for the production of microcapsules:

The quantities of catalytically active components required for the production of the microcapsules are very small and are generally from 0.1 to 0.5% by weight, based on the outer phase so that these components may be regarded as catalysts. The weight ratio of inner and outer phase usually is 1 : 10 to 1 : 3.

The quantity of the catalytically active components has become less critical, as no stoichiometric ratios between the functional groups in the polycarbodiimides and the catalysts are required. Rather the quantities used are geared to the desired and readily variable velocity of the shell-forming reaction.

The quantity of acid which must be added to the water serving as external phase after encapsulation for neutralisation is also low on account of the small quantity of catalytically active component. Only little undesired salt is generated and a relatively pure final product is formed. This is important in the production of reaction carbon paper, for example.

Polycarbodiimides may be produced from the corresponding isocyanates, for example, from 2,4- and 2,6-diisocyanato-toluene or mixtures of these isomers, particularly, a mixture comprising 80% by weight of 2,4- and 20% by weight of 2,6-diisocyanatotoluene, 4,4'-diisocyanato-diphenyl-methane, the phosgenation products of acid-catalysed aniline/formaldehyde condensates, 1,3-diisocyanato-benzene, 1,3,5-trimethyl- and 1,3,5-triisopropylbenzene-2,4-diisocyanate, 1,6-diisocyanatohexane, and 1-isocyanato-3,3,5-trimethyl-5-isocyanatomethyl-cyclohexane. However, the polycarbodiimides which are suitable for the process described are not exclusively derived from the pure isocyanates; rather, their undistilled precursors as well as reaction products of these polyisocyanates with mono- or polyalcohols having an NCO/OH ratio of greater than 1 : 1 and modification products of these polyisocyanates may also be considered. As such, polyisocyanates which additionally contain biuret-, allophanate-, isocyanate- and carbodiimide groups are mentioned.

Polycarbodiimides which are used according to the invention preferably have free isocyanate terminal groups, and thus the idealised structure:

in which R represents alkylene, cycloalkylene and arylene groups and $x$ is a whole number of from 2 to 40, wherein partially functional carbodiimide- and/or isocyanate groups formed as a result of dimerisation may be present as uretdione- or uretone imine groups etc. R is preferably a $C_2$–$C_6$-alkylene-, $C_5$–$C_7$-cycloalkylene-, or a $C_6$–$C_{12}$-arylene radical.

The phospholine oxide catalyst added for polymerising the polyfunctional isocyanates to the polycarbodiimides may be contained in the system as phospholine imino groups, for example, in the form of the idealised structure:

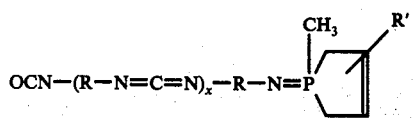

wherein $x$ and R have the same meaning as above and R' may be alkyl- and cycloalkyl groups. R' is preferably alkyl having from 1 to 6 carbon atoms and cycloalkyl having from 5 to 7 carbon atoms.

The production of such polycarbodiimides is known and is described, for example, in the Encyclopaedia of Polymer Science and Technology, Vol. 7, pages 751 and 754. The polycarbodiimides are obtained in the simplest case by adding phospholine oxides to the isocyanates and by crushing the foam-like material obtained.

In the production of the microcapsules, any compounds which are also known as catalysts for isocyanate reactions may be used. Typical examples of tertiary water-soluble amines include: triethylamine, N-methyl-morpholine, N-ethyl-morpholine, N-methyl-N'-dimethylaminoethyl-piperazine, N,N,N',N'-tetramethylethylenediamine, bis-(dimethylaminoethyl)-ether, 1,4-diaza-bicyclo(2,2,2)octane, 1,2-dimethyl-imidazole, 2-methyl-imidazole, N-diethylethanolamine, the silamines with carbon-silicon bonds as described, for example, in German Pat. No. 1,229,290, for example, 2,2,4-trimethyl-2-silamorpholine, and, finally, mixtures of the catalysts described.

Typical examples of substantially basic organic and inorganic water-soluble components which catalyse self-condensation reactions, such as trimerisation-reactions of isocyanate groups are:

Alkali formates, alkali acetates, carbonates, borohydrides, and hydroxides (see also British Patent 837 120 and H. Ulrich, "Cycloaddition Reactions of Heterocumulenes," Academic Press, New York 1967) as well as alkoxides and other organic bases.

Examples are: alkali methoxide, alkali phenolates, alkali phenolates with additional tertiary amino-groups, i.e. 2,4,6-Tris-(dimethyl-aminomethyl)-phenol, organic ammonium hydroxides, i.e. trimethyl benzylammonium hydroxide and tetramethyl ammonium hydroxide.

The quantities of catalysts required for the production of the microcapsules are very small and are from 0.1 to 0.5% by weight, based on the dispersing agent.

According to the invention, solid and liquid organophilic substances may be encapsulated. The core materials must be miscible with the polymer or with the polymer solution. This may be achieved in many cases by the addition of a solution promotor or solvent mixture which boils at below 80° C. Examples of suitable core materials include: mineral oils, fatty oils, trichloroethyl phosphate, thiophosphoric acid ester, aromatic and aliphatic hydrocarbons and chloro-hydrocarbons, scents, colour forming solutions of reactive carbon papers such as N-benzoyl-leucomethylene blue and crystal violet lactone in aromatic solvents.

For microencapsulation in particular:

For the reactive process, the polycarbodiimide is dissolved in the core materials or in an inert solvent and a compatible core material (as described overleaf) is mixed with the solution. For the purposes of miscibility, it may also be appropriate to proceed in the reverse order for the latter case.

In a shear gradient, which is preferably generated by intensive mixing with small mixers or mixing machines, the resulting organic phase is introduced into a liquid phase immiscible with it, for example, water which contains a component which is catalytically active towards isocyanate groups. The catalyst may also be added after dispersion. The encapsulation may be carried out continuously and discontinuously. The turbulence level during mixing determines the diameter of the microcapsules obtained. This may be approximately 5 to 5000 μm according to the mixing conditions.

The weight ratio of core material to shell material in the finished microcapsules is normally in the range of from 50 : 50 to 90 : 10.

In the following examples parts and percentages are by weight.

EXAMPLE 1

(a) Production of the Polymer (H-PCD)

134 g of hexamethylene-1,6-diisocyanate are mixed with 2 g of 1-methylphospholine-1-oxide and heated to 50° C. for 15 hours. An exceptionally viscous product is produced with slow evolution of carbon dioxide, this product being soluble in the following solvents: methylene chloride, chloroform, chlorobenzene, toluene, solvent naphtha, Chlophene A 30, tri-n-butyl-phosphate, trichloroethyl phosphate, ethylene chloride, 1,3-dichloropropane, cyclohexane, diphenylether, methyl ethyl ketone, acetone, ethyl acetate, pyrrolidone, N-methyl-pyrrolidone, dimethylformamide, benzene, dioxane and tetrahydrofuran. The polycarbodiimide should be kept at temperatures of below 5° C.

(b) Encapsulation 1.1 g of crystal violet lactone and 0.5 g of N-benzoyl leucomethylene blue are dissolved in 25 g of solvent naphtha (aromatic mixture of xylene, cumene, toluene and other napthene oils of the BV Aral) while stirring and heating to about 70° C. After cooling the solution, 5 g of the polycarbodiimide described in (a) were added and dissolved.

The homogeneous mixture was subsequently dispersed in 300 ml of water, in which 1.5 g of polyvinyl alcohol (Moviol 70/98) is dissolved as an emulsifying agent. A Kotthoff mixing siren is used for dispersing (6,500 rpm, 1 liter beaker about 10 seconds). A solution of 0.5 g of N-dimethylaminoethyl-N'-methylpiperazine in 70 g of water was subsequently added under similar dispersion conditions. The dispersion apparatus (after about 50 - 60 seconds) is then replaced by a simple laboratory stirrer of the Lenart-Rapid type (500 rpm). The contents were rapidly heated to 80° C. and kept at this temperature for 2 hours, with continuous stirring. The diameter of the capsules obtained is in the size range of from 5 to 20 μm.

EXAMPLE 2

5 g of the polycarbodiimide described in (1a) are dissolved in 25 g of Solvesso 100 (an aromatic mixture made by Esso A.G.). Further processing takes place as described in (1b). In a variation, a mixture of 60 parts of N-dimethylaminoethyl-N'-methylpiperazine, 35 parts of N-diethyl-ethanolamine and 5 parts of 2,2,4-trimethyl-2-silamorpholine is used as catalyst in an analogous quantity.

The diameter of the capsules obtained is in the size range of from 5 to 20 μm.

EXAMPLE 3

5 g of the polycarbodiimide described in (1a) are dissolved in 25 g of solvent naphtha. The encapsulation takes place as described in (1b) except that 0.5 g of bis-(di-methylaminoethyl)-methylamine are used as catalyst. The capsule size is approximately 5 to 20 μm.

EXAMPLE 4

(a) Production of the Polymer (T 80-PCD)

139 g of a mixture of 80% by weight of 2,4-diisocyanato-toluene and 20% by weight of 2,6-diisocyanato-toluene are mixed with 2 g of 1-methylphospholine-1-oxide and stirred at room temperature.

The mixture foams slowly and produces a readily pulverised polycarbodiimide foam after about 12 hours, which dissolves in solvents such as methylene chloride, chloroform, chlorobenzene, o-dichlorobenzene, toluene, tetrahydrofuran, N-methylpyrrolidone and dimethylformamide. The softening range of the reaction product is above 200° C. It is recommended that the polycarbodiimide be stored at temperatures below 5° C., in order to stop further reaction as far as possible.

(b) Encapsulation 2 to 3 g of the polycarbodiimide described in (4a) are dissolved in 5 g of chloroform and added to 20 g of Marlotherm (a heating bath oil made by Chemische Werke Hüls/Marl). The homogeneous mixture is subsequently dispersed in 300 ml of water which contains 1.5 g of polyvinyl alcohol as an emulsifying agent (Moviol 70/98). A simple laboratory stirrer of the Lenart-Rapid type is used for dispersion (500 rpm, 1 liter beaker, 10 seconds). A solution of 0.5 g of N-dimethylaminoethyl-N'-methylpiperazine in 70 g of water is subsequently added. The contents were rapidly warmed to 80° C. with continuous stirring and maintained at this temperature for about 2 hours. The resulting capsule size is approximately 400 to 1000 μm.

EXAMPLE 5

25 g of the herbicide Parathion-methyl (O,O-dimethyl-O-(4-nitrophenyl) monothiophosphate are mixed as a 80% solution in solvent naphtha with 5 g of the polycarbodiimide described in (1a). The resulting homogenous organic phase was subsequently dispersed in water by using a Kotthoff mixing siren (8.900 rpm, about 60 seconds). In the water are dissolved 2 g of polyvinyl alcohol (Moviol 50/98) as an emulsifying agent. During the emulsifying period 0.5 g sodium hydroxide (solved in 69.5 g water) are added to the aqueous phase.

The Kotthoff mixing siren is then replaced by a simple laboratory stirrer of the Lenart Rapid type (500 rpm) and the mixture during 2 hours kept at 60° C. with continuous stirring.

The resulting slurry was neutralized by adding acetic acid. The diameter of the capsules obtained is in the size range of from 1 to 12 μm.

We claim:

1. A method for the production of microcapsules comprising dissolving a film-forming polycarbodiimide with terminal isocyanate groups in a miscible core material or in an inert solvent with dissolved core material, introducing the resulting organic phase into an immiscible aqueous phase which contains a water-soluble catalyst for isocyanate reactions which causes self-condensation of the dissolved film-forming polycarbodiimide, whereby under the influence of intensive mixing microcapsules are formed at the phase interface.

2. A method as claimed in claim 1, wherein the aqueous phase contains from 0.1 to 0.5% by weight of the catalyst, based on the weight of the outer phase.

3. A method as claimed in claim 1, wherein the organic phase is introduced into the aqueous phase in a shear gradient.

4. Microcapsules when prepared by a method as claimed in claim 1.

5. A method as claimed in claim 1 wherein the polycarbodiimide is

wherein R is alkylene, cycloalkylene or arylene and $x$ is an integer of from 2 to 40.

* * * * *